United States Patent Office 3,428,711
Patented Feb. 18, 1969

3,428,711
HINDERED POLYMERIC TERTIARY AMINES AS STABILIZERS FOR POLYURETHANES
Oliver Larry Hunt, Waynesboro, Va., assignor to E. I. du Pont de Nemours and Company, Wilmington, Del., a corporation of Delaware
No Drawing. Filed Feb. 1, 1966, Ser. No. 523,891
U.S. Cl. 260—859
Int. Cl. C08g 41/04, 51/06
7 Claims

ABSTRACT OF THE DISCLOSURE

Segmented polyurethanes are stabilized with polymeric tertiary-aminoalkyl acrylates and methacrylates. Bulky substituent groups are chosen to provide sterically hindered amines. Polyurethanes stabilized with these hindered amines are more resistant to degradation upon exposure to chlorine than are polyurethanes stabilized with similar amines which are not sterically hindered.

---

This invention relates to color-stabilized segmented polyurethanes. More particularly, the invention relates to spandex fibers having improved resistance to degradation upon exposure to chlorine.

It is known that spandex fibers on storage and upon exposure to atmospheric conditions are frequently subject to discoloration which results in an undesirable yellowing of the fibers. The known tendency to discolor is particularly pronounced in the case of spandex containing in the polymer chain recurring ureylene residues, i.e., radicals of the formula —NH—CO—NH—. If the ureylene residue is attached to a carbon atom of an aromatic ring, the tendency to discolor is even more pronounced.

It is taught in Arvidson and Blake Patent U.S. 2,999,839 that aliphatic amines having a molecular weight above 280 provide stabilization against discoloration in segmented polyurethanes. Among the suitable amines disclosed in U.S. 2,999,839 are the polymeric amines, poly-(N,N-diethyl-$\beta$-aminoethyl methacrylate) and poly(N,N-dimethyl-$\beta$-aminoethyl methacrylate). Although these materials are indeed valuable stabilizers for spandex and do offer protection against fume discoloration, it is found that spandex compositions stabilized with these materials become discolored and suffer loss of physical properties when exposed to chlorine bleaches, particularly in the presence of non-ionic detergents.

This invention provides color-stabilized segmented polyurethane compositions. More particularly, the stabilized compositions of this invention degrade less on exposure to hypochlorite or chlorine bleaches, even in the presence of non-ionic detergents, than do similarly stabilized spandex compositions of the prior art. In addition, the stabilizers described herein afford ultraviolet stability, fume stabilization, dyeability, and dye lightfastness to spandex compositions.

The advantages of this invention are attained by a segmented polyurethane having a stabilizing quantity incorporated therein of a polymeric tertiary amine having repeating units of the formula

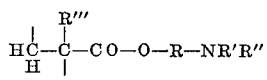

wherein R is an alkylene radical containing at least two carbon atoms, R' is an alkyl radical containing at least three carbon atoms, R" is an alkyl radical, R''' is selected from the group consisting of H and CH$_3$, R, R' and R" being so selected that (1) R' and R" together contain at least five carbon atoms and (2) the sum of the respective steric factors is at least seven. Surprisingly, it has been found that these polymeric tertiary amines cause less degradation of spandex on exposure to hypochlorite, as compared to closely related materials of the prior art.

The term "spandex fiber" is used in its generic sense herein to mean a manufactured fiber in which at least 85% of the fiber-forming substance is a long-chain, synthetic, segmented polyurethane. It is not intended, however, that the invention be limited to fibers of such segmented polyurethanes since the stabilization is achieved with other shaped articles, such as films and the like. The segmented polyurethanes which provide spandex fibers contain the recurring linkage —O—CO—NH—. A substantial number of the urethane nitrogens may be joined to radicals, usually aromatic, which are further attached to a ureylene residue —NH—CO—NH—. Generally speaking, these segmented polyurethanes are prepared from hydroxyl-terminated prepolymers such as hydroxyl-terminated polyethers and polyesters of low molecular weight. Reaction of the prepolymer with a stoichiometric excess of organic diisocyanate, preferably an aromatic diisocyanate, produces an isocyanate-terminated polymeric intermediate, which may then be chain-extended with a difunctional, active hydrogen-containing compound, such as water, hydrazine, organic diamines, glycols, dihydrazides, amino-alcohols, etc.

Among the segmented polyurethanes of the spandex type are those described in several patents among which are U.S. 2,929,804, 2,953,839, 2,957,852, 3,040,003, 3,071,557 and 3,097,192. As described in the aforementioned patents, the segmented polyurethane elastomers are comprised of "soft" segments, derived from polymers having a melting point below about 50° C. and a molecular weight of above about 600, and "hard" segments, derived from a crystalline polymer having a melting point above about 200° C. in the fiber-forming molecular weight range. Most of such polyurethanes, when in filament form, have a high elongation and tensile recovery and a low stress decay. This invention is particularly effective when applied to the spandex fibers derived from organic diamines and described in U.S. 2,929,804, and this category of spandex is preferred in the practice of this invention.

From a standpoint of commercial availability, the preferred hydroxyl-terminated prepolymers are the polyether glycols, polyester glycols, and mixtures thereof. The polyether glycols may contain a single type of linkage, such as in the poly(alkylene oxide) glycols, or may have more than one type of linkage, as in the polyoxythiaalkylene glycols and in the polyetherester glycols. Even where the linkages are the same, the composition may be a copolymer, such as a copolyether prepared from a mixture of glycols. The polyether glycols may be substituted with halogen, alkyl, and similar groups, which do not interfere with the subsequent polymerization reactions. Representative polyethers which may be used include the poly-(alkylene oxide) glycols, such as polyethylene glycol, polypropylene glycol, and polytetramethylene ether glycol, and the polyacetals, such as polydioxolane and polymers from the reaction of formaldehyde with hexamethylene glycol. For the purposes of this invention, the preferred polyether glycols include polytetramethylene ether glycol and glycols of polytetramethylene ether having urethane and/or ester groups in the polymer chain.

The polyester glycols may be prepared by reacting dibasic acids, esters, or acid halides with a molar excess of monomeric glycol, as is well known in the art. Suitable glycols are the polymethylene glycols, such as ethylene, propylene, pentamethylene, hexamethylene, decamethylene glycols; substituted polymethylene glycols, such as 2-ethyl-2-methyl-propanediol, and cyclic glycols, such as cyclohexanediol. These glycols may be reacted with the proper molar ratio of aliphatic, cycloaliphatic, or aromatic acids or their ester-forming derivatives to produce low-molecular-weight polymers. Suitable acids for preparing polyesters and/or copolyesters include carbonic, adipic, sebacic, terephthalic, and hexahydroterephthalic acids. Mixtures of glycols and/or mixtures of acids or acid derivatives to form copolyesters may also be employed. The alkyl- and halogen-substituted derivatives of these acids may also be used. An ether-containing glycol such as triethylene glycol, may be used to produce polyetherester glycols. It will be apparent that polyester glycols derived from lactones or hydroxy acids may also be used.

The hydroxyl-terminated soft segment is generally reacted with an organic diisocyanate which is preferably an aromatic diisocyanate, as indicated hereinabove. Suitable aromatic diisocyanates include p-phenylene diisocyanate, 4,4'-biphenylene diisocyanate, p,p'-methylenediphenyl diisocyanate, and p,p'-isopropylidenediphenyl diisocyanate. Aliphatic and cycloaliphatic diisocyanates, for example, 4,4'-methylenedicyclohexyl diisocyanate, are also suitable. The diisocyanates may contain other substituents, although those which are free from reactive groups other than the two isocyanate groups, are ordinarily preferred. The organic diisocyanate is not critical for this invention, and any of those disclosed in the prior art pertaining to spandex may be used.

The difunctional, active hydrogen-containing compounds suitable as chain-extenders include a wide variety of compounds, as indicated hereinabove. Organic diamines are preferred. Suitable diamines include ethylenediamine, tetramethylenediamine, 1,2-propylenediamine, m-xylylenediamine, p-xylylenediamine, cyclohexylenediamine, piperazine, and many others. Symmetrical aliphatic diamines are preferred, but aromatic diamines, e.g., p-phenylenediamine and p,p'-methylenedianiline, may be used.

The stabilizers useful in the present invention are certain homopolymers and copolymers of

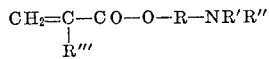

wherein R, R', R'', and R''' are as previously defined. The stabilizers are polymers of tertiary-aminoalkyl acrylates and methacrylates. R''' is either H or $CH_3$. R is an alkylene radical containing at least two carbon atoms, such as ethylene, propylene, trimethylene, tetramethylene and unsym-dimethylethylene. R' is a primary, secondary, or tertiary alkyl radical containing three or more carbon atoms, such as i-propyl, t-butyl, n-hexyl. R'' is a primary or secondary alkyl radical, such as methyl, ethyl, i-propyl. R' and R'' may be cycloalkyl, e.g., cyclohexyl, but may not be aromatic, e.g., phenyl.

The polyacrylate and polymethacrylate stabilizers useful in this invention may be prepared from methyl acrylate or methyl methacrylate and the corresponding tertiary-aminoalkanol, HO—R—NR'—R'', according to the procedure described in the Graves Patent U.S. 2,138,763. Because the polyacrylates have poorer hydrolytic stability than the polymethacrylates, they are less desirable as stabilizers in the compositions of this invention. Accordingly, the polymethacrylates are preferred for this invention.

This invention rests on the discovery that the advantageous polymeric tertiary amines are those which contain bulky alkyl groups attached to the nitrogen atom. The amines are thus said to be sterically hindered. The suitable tertiary-aminoalkyl acrylates or methacrylates are those having R, R' and R'' within the above-stated definition and also having a sufficient degree of steric hindrance. The degree of steric hindrance is expressed by use of steric factors. A steric factor is assigned to each of the radicals attached to the nitrogen atom, i.e., R, R', and R'', according to the values in the table below. The sum of the steric factors so assigned indicates the total steric hindrance of the amine.

| For R' and R'': | Steric Factor |
|---|---|
| Methyl | 1 |
| Ethyl | 2 |
| n-Alkyl containing 3 carbon atoms or more | 3 |
| Isopropyl | 4 |
| Isobutyl and other β-branched alkyl | 4 |
| Secondary alkyl containing 4 carbon atoms or more | 5 |
| Cycloalkyl | 5 |
| Tertiary-butyl | 6 |
| For R: | Steric Factor |
| $(CH_2)_n$ where $n$ equals 2, 3, 4, etc. | 0 |
| Each side chain on $(CH_2)_n$ | 1 |

For satisfactory stabilization according to this invention, the sum of the steric factors applicable to the amine stabilizer should be 7 or more.

Examples of suitable stabilizers with the corresponding sum of steric factors are the polymers of acrylic and methacrylate esters of:

|  | R | R' | R'' | Sum |
|---|---|---|---|---|
| 2-diisopropylaminoethanol | 0 | 4 | 4 | 8 |
| 2-t-butylmethylaminoethanol | 0 | 6 | 1 | 7 |
| 1-di-n-propylamino-2-propanol | 1 | 3 | 3 | 7 |

The greater the sum of the steric factors in the stabilizer, the less degradation occurs in the spandex on exposure to chlorine. In some cases, however, the steric hindrance on the nitrogen atom restricts the mobility of the side chain containing the nitrogen. It is thought that the reduced mobility is the cause of increased set and decreased power in some stabilized spandex compositions. This deficiency can be overcome by the use of copolymers, instead of homopolymers of the acrylate and methacrylate esters. The copolymerization is carried out in known manner, and the comonomers should be those whose homopolymers have low glass-transition temperatures ($T_g$), such as octyl methacrylate, decyl methacrylate, and lauryl methacrylate. For best over-all properties in the resulting spandex, stabilizers having $T_g$, as measured by Differential Thermal Analysis, below about —5° C. are preferred.

Other useful comonomers include unsaturated amino compounds, such as 2-di-n-butylaminoethyl methacrylate (steric factors=6). Introduction of a comonomer containing amino nitrogen in which the sum of the steric factors is substantially less than 6 should be avoided.

The amount of stabilizer may vary within a wide range with amounts from a fraction of 1%, e.g., about 0.5%, to about 5% or even 10% or more by weight, based on the segmented polyurethane, being effective. The optimum quantity will vary and for reasons of economy should, of course, be kept as low as possible. Too high a concentration adversely affects physical properties of the polyurethane. The selection of the optimum quantity will depend on a number of factors, such as the particular type of segmented polyurethane and the use to which the stabilized composition is to be put. For fiber uses, the fiber geometry and porosity will affect the optimum quantity of stabilizer. Preferably, amounts from about 2% to about 6% by weight are utilized.

Although concentrations of the stabilizer as low as about 1% based on the segmented polyurethane are beneficial, it should be noted that the advantage of the stabilizers of this invention over closely related materials of the prior art is more apparent at the higher concentrations. Thus, the hindered polymeric amines of this invention may be used at substantial concentrations resulting in fewer of the undesirable side effects associated with the unhindered polymeric amines of the prior art.

When the stabilizer is a copolymer, only the concentration of the hindered polymeric amine component is to be considered. Comonomers such as lauryl methacrylate are disregarded in calculating the amount of stabilizer present.

Although the stabilizer may be incorporated in the segmented polyurethane by various procedures, preferably it is dissolved in a solution of the segmented polyurethane prior to shaping. The stabilizer may be added during the polymerization step, for example, before formation of the ureylene radicals by chain-extension of the isocyanate-terminated polymeric intermediate with a diamino compound. However, it is generally convenient to add the stabilizer to the polyurethane solution. The solution may then be spun into fibers by the usual extrusion techniques, e.g., dry-spinning, or it may be cast into a film in the conventional way.

Less preferred methods for incorporating the stabilizer in fibers include dissolving or dispersing the stabilizer in a suitable inert, liquid medium and then immersing the fibers or passing them through the treating bath.

Additives, fillers, plasticizers, pigments, and the like, which are conventionally used with segmented polyurethanes, may be used as desired with the stabilizers of this invention. In addition to useful applications in fibers and films, the stabilized polyurethanes of this invention may be formed into other types of shaped articles, e.g., by molding.

This invention will be further illustrated, but is not intended to be limited, by the following examples in which parts and percentages are by weight unless otherwise specified.

The degree of yellowness, referred to in the examples as "$b$" value, is determined from colorimetric data obtained by analyzing films or continuous filament samples in aggregates which are about three inches square. The reflectance ratios of the samples in the green and blue filter settings of a colorimeter are measured, using a Model IV Color Master Differential Colorimeter, manufactured by Manufacturers Engineering and Equipment Corp., Hatboro, Pa., and calibrated against the manufacturer's standard reference plates and the National Bureau of Standards' certified reflectance plates. Three readings are taken on each of the samples, one of the measurements for the filament samples being made with the sample rotated 90° from the position of the first reading. The "$b$" values are then calculated from the average of three readings, using the following formula $$b = 42.34(G^{\frac{1}{2}} - B^{\frac{1}{2}})$$

where G represents the reflectance ratio with the green filter and B represents the reflectance ratio with the blue filter.

The test for smog-discoloration is performed by wrapping samples of continuous filaments on a metal frame and exposing them to a synthetic atmosphere containing air, nitrogen dioxide, sulfur dioxide, and 2-pentene, during which exposure the samples are irradiated by a combination of ultraviolet and visible light. The samples are measured for color, both before and after exposure.

The test for chlorine discoloration is performed by wrapping the filaments on a block of "Teflon" plastic, measuring the samples for color, and then immersing them for three 30-minute periods at 70° C. in an aqueous solution containing 250 parts per million of active chlorine and 0.2% of liquid "Lux," a non-ionic detergent, said solution having a pH of about 8. Films are cast and exposed on a "Mylar" polyester film backing. The samples are rinsed with cold water, dried thoroughly and again measured for color.

EXAMPLE I

Polytetramethylene ether glycol of molecular weight about 1800 and p,p'-methylenediphenyl diisocyanate are intimately mixed in the ratio of 1.7 mols of diisocyanate per mol of polyether glycol and held about 90 to 100 minutes at 80–90° C. To yield an isocyanate-terminated polyether. The isocyanate-terminated polyether is cooled and dissolved in N,N-dimethylacetamide to give a mixture containing 45% solids. This mixture is thoroughly agitated for 15 minutes and is conducted to a chamber in which (1) a stoichiometric amount of a mixture consisting of 80 mol percent ethylenediamine and 20 mol percent 1,3-cyclohexylenediamine in additional dimethylacetamide and (2) about 7 mol percent diethylamine (based on total diamines) in dimethylacetamide are added with strong agitation. The mixture is held at a temperature of about 100° C. for 2–3 minutes. The resulting solution of segmented polyurethane contains approximately 36% solids and has a viscosity of about 1800 poises at 40° C. The polymer has an intrinsic viscosity of 1.15, measured at 25° C. in hexamethylphosphoramide at a concentration of 0.5 gram per 100 ml. of solution.

To the viscous polymer solution are added titanium dioxide, 4,4'-butylidenebis(6-t-butyl-m-cresol), and ultramarine blue pigment in addition to the polymeric amine indicated in the table below, such that the final mixture contains 5%, 1%, 125 parts per million, and 5%, respectively, of each additive, based on total solids. The resulting mixture can be dry-spun by conventional methods into highly elastic filaments. Chlorine discoloration is measured by casting the mixture into films which are thoroughly dried before testing. Control films are cast from a portion of the polymer solution which contains the first three additives listed but no polymeric amine. The following results are obtained:

| Polymeric Amine | "$b$" Values | | $\Delta b$ | $\Delta b$ $\Delta$ control |
|---|---|---|---|---|
| | As Prepared | After Exposure | | |
| Poly(diisopropylaminoethyl methacrylate) | 1.7 | 5.7 | 4.0 | −2.0 |
| Poly(t-butylmethylaminoethyl methacrylate) | 1.6 | 6.9 | 5.3 | −0.7 |
| Poly[2(di-n-propylamino)-1-methylethyl methacrylate] | 1.7 | 6.3 | 4.6 | −1.4 |
| Control | 1.8 | 7.8 | 6.0 | |
| Poly(diethylaminoethyl methacrylate) | 1.9 | 14.3 | 12.4 | 6 4 |

EXAMPLE II

To the viscous polymer solution described in the first paragraph of Example I are added titanium dioxide, 4,4'-butylidenebis(6-t-butyl-m-cresol), and ultramarine blue pigment as described in Example I, together with 5% of a copolymer of diisopropylaminoethyl methacrylate and decyl methacrylate (in a 70/30 weight ratio of the respective monomers) to furnish 3.5% of the amine-containing repeating unit. A control sample containing 5% of poly(diethylaminoethyl methacrylate) is prepared, and the two solutions are spun into 420-denier fibers by conventional dry-spinning methods. The tenacity at break of the fibers is determined in the usual way, and yarn skeins of the samples are immersed in the chlorine-containing solution described above for the chlorine discoloration test at a 140/1 weight ratio of bath to fiber. After each 30-min. period, the fibers are rinsed, dried, and the tenacity again measured. The table below indicates the percent retention of the original break tenacity after five and seven 30-minute exposures, respectively.

| Additive | Percent Break Tenacity Retained | |
|---|---|---|
| | 5 Exposures | 7 Exposures |
| Copolymer | 84 | 81 |
| Control | 42 | 11 |

EXAMPLE III

Spandex filaments are prepared as in Example II. Control filaments containing 5% of poly(diethylaminoethyl methacrylate) in place of the methacrylate copolymer are also prepared. Bobbins of freshly spun filaments are measured for degree of yellowness, then exposed to the ambient atmosphere for 48 hours and again measured for degree of yellowness. The following results are obtained:

Additive: Δb
    Copolymer _____ 0.3
    Control _____ 1.3

EXAMPLE IV

To the viscous polymer solution described in the first paragraph of Example V are added various materials in the concentrations shown in the table below. The mixtures are dry-spun in the usual way to produce spandex filaments of 40 denier. Skeins of the filaments are immersed at 70° C. in an aqueous solution containing 1000 parts per million of active chlorine and 0.2% of "Tide," an anionic detergent. Every two hours the aqueous solution is poured off and is replaced with fresh solution. The number of hours to substantially complete degradation (approximately 90% of tenacity loss) is determined by periodically stretching the filaments. The results are shown in the following table.

Additives:                    Hours to Degradation
    1% 1,3,5-trimethyl - 2,4,6 - tris(3,5-di-t-butyl-4-hydroxybenzyl)benzene; 2.5% copolymer of diisopropylaminoethyl methacrylate and decyl methacrylate (75/25 weight ratio); 2.5% titanium dioxide _____ 14
    1% 1,3,5-trimethyl - 2,4,6 - tris(3,5-di-t-butyl-4-hydroxybenzyl)benzene; 3% poly(diethylaminoethyl methacrylate); 0.5% 2-(2'-hydroxy-3'-t-butyl-5'-methylphenyl)5 - chlorobenzotriazole; 5% titanium dioxide _____ 6.5
    None _____ 8

EXAMPLE V

A segmented polyurethane is prepared from polytetramethylene ether glycol of molecular weight about 2000, capped with 2 mols of p,p'-methylenediphenyl diisocyanate, and chain-extended in dimethylacetamide with a stoichiometric amount of m-xylylenediamine according to French Patent 1,388,558. The polymer solution contains approximately 35% solids. The polymer has an intrinsic viscosity of 1.15, measured at 25° C. in hexamethylphosphoramide at a concentration of 0.5 gram per 100 ml. of solution.

To the viscous polymer solution are added titanium dioxide, 4,4' - butylidenebis(6 - t - butyl - m - cresol), and poly(diisopropylaminoethyl methacrylate), such as that the final mixture contains 5%, 1%, and 5%, respectively, of each additive, based on the segmented polyurethane.

The mixture is dry-spun in the usual way to produce spandex filaments of 420 denier. The filaments are exposed in the test for chlorine discoloration. The difference in b values is 1.7. Control spandex filaments of 420 denier containing 5% of poly(diethylaminoethyl methacrylate) in place of the poly(diisopropylaminoethyl methacrylate) are also obtained by dry-spinning. On exposure to the chlorine-discoloration test, the control filaments show a Δb of 7.9.

EXAMPLE VI

To the viscous polymer solution described in the first paragraph of Example V are added titanium dioxide and a copolymer of diisopropylaminoethyl methacrylate and decyl methacrylate (in a 75/25 weight ratio of the respective monomers), such that the final mixture contains 0.5% and 1%, respectively, of each additive based on the segmented polyurethane (the amount of amine-containing repeating unit thus being 0.75% based on the segmented polyurethane). The mixture is dry-spun in the usual way to produce spandex filaments of 40 denier. Control filaments containing no polymeric amine or titanium dioxide are prepared. The filaments are exposed for periods of three hours and sixteen hours in the smog-discoloration test with these results:

|  | Δb | |
| --- | --- | --- |
|  | 3 hours | 16 hours |
| Sample containing 1% polymeric amine, 0.5% TiO₂ | 2.0 | 16.5 |
| Control | 3.7 | 30.8 |

Other samples of the filaments are heated in air at 150° C. for eight hours. The sample containing the additives retains 23% of its original tenacity whereas the control sample retain none.

Preparation of polymeric tertiary amines

Monomer preparation—(N,N-diisopropylaminoethyl methacrylate 500 grams methyl methacrylate containing 50 p.p.m. hydroquinone monomethyl ether are mixed under nitrogen with 500 grams N,N-diisopropylaminoethanol in a resin pot equipped with a thermometer and a 12 inch straight pipe distillation column with a vacuum distillation head. Several micro porous boiling chips are placed in the pot to aid refluxing and 2.4 grams of phenothiazine are added to prevent methacrylate polymerization. Any water which might be present is removed at atmospheric pressure as a water-methyl methacrylate azeotrope which distills out below about 95° C. Removal of the water can be followed by observing formation of water droplets in the head.

The water must be removed to prevent it from decomposing the catalyst. After all water is removed, the pot is cooled to below 80° C. and 15 grams of tetraisopropyl titanate catalyst is added to the pot. The pot is then heated until a head temperature of about 70° C. (at atmospheric pressure) is obtained. This indicates an azeotrope of excess methyl methacrylate and methanol from the reaction is distilling from the reaction system. The pot temperature is controlled so that the azeotrope keeps slowly distilling over at the lowest possible head temperature—usually below 73° C. The reaction is continued until all the methanol is removed or the pot temperature reaches 150° C. The pot is cooled, more boiling chips are added, the nitrogen is shut off, and a water aspirator vacuum is applied to the system. The unreacted components are removed, which is indicated by a head temperature of 120° C., at about 15 mm. Hg pressure. The product is collected between 120 to 123° C. at about 15 mm. Hg.

Other tertiary amines are prepared by replacing the N,N-diisopropylaminoethanol in the above example with the chemical equivalent of the desired amino alcohol. To achieve acceptable reaction rates and product yields with the more sterically hindered compounds, the amount of tetraisopropyl titanate catalyst may be tripled and the methyl methacrylate excess doubled; a higher head temperature (80° C.) may also be employed.

Polymerization 100 grams of the above monomeric teritiary amine product is mixed with 67 grams, N,N-dimethylacetamide in a three neck round bottom flask, equipped with a nitrogen inlet, a stirrer, and a reflux condenser. A thermometer is suspended through the condenser into the liquid. The mixture, under nitrogen, is heated with stirring to 80° C. The heat is removed at 80° C. and 1.5 grams of azodiisobutyronitrile catalyst is added rapidly so that all of the catalyst strikes the liquid. A temperature between 80 and 85° C. is maintained by applying cooling or heating for ½ hour. 0.15 gram of azodiisobutyronitrile is now added and an 80° C. temperature is maintained for two additional hours. Coopolymerization may be effected in the same general manner.

What is claimed is:
1. A composition comprising a segmented polyurethane and a stabilizing quantity of a polymeric tertiary amine having repeating units of the formula

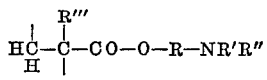

wherein R is an alkylene radical containing at least two carbon atoms, R' is an alkyl radical containing at least three carbon atoms, R" is an alkyl radical, R'" is selected from the group consisting of H and $CH_3$, R, $R_2$ and R" being so selected that (1) R' and R" together contain at least five carbon atoms and (2) the sum of the respective steric factors is at least seven, wherein said steric factors for radicals representing R, R' and R" are as follows:

| For R' and R": | Steric factor |
|---|---|
| Methyl | 1 |
| Ethyl | 2 |
| n-Alkyl containing 3 carbon atoms or more | 3 |
| Isopropyl | 4 |
| Isobutyl and other β-branched alkyl | 4 |
| Secondary alkyl containing 4 carbon atoms or more | 5 |
| Cycloalkyl | 5 |
| Tertiary-butyl | 6 |

| For R: | Steric factor |
|---|---|
| $(CH_2)_n$ where $n$ is an integer of at least 2 | 0 |
| Each side chain on $(CH_2)_n$ | 1 |

2. The composition of claim 1 wherein the segmented polyurethane is an elastomeric polymer having a plurality of polymeric segments alternating in the polymer chain with ureylene-containing segments, the polymeric segments being the residue remaining after removal of the terminal hydroxyl groups from a hydroxyl-terminated polymer having a melting point below 50° C. and a molecular weight above about 600, the ureylene-containing segments being at least one repeating unit of a polymer having a melting point above about 200° C. in the fiber-forming molecular weight range.

3. The composition of claim 2 wherein the polymeric segment is derived from a poly(alkylene oxide) glycol.

4. The composition of claim 1 in the form of an elastic filament.

5. The composition of claim 1 wherein the quantity of said repeating units provided by the polymeric tertiary amine is about 0.5 to about 10% by weight, based on the segmented polyurethane.

6. The composition of claim 1 wherein the polymeric tertiary amine is poly(diisopropylaminoethyl methacrylate).

7. The composition of claim 1 wherein the polymeric tertiary amine is a copolymer of diisopropylaminoethyl methacrylate and decyl methacrylate.

References Cited

UNITED STATES PATENTS 2,999,839 9/1961 Arvidson _____ 260—45.9
3,175,990 3/1965 Ruehl _____ 260—859

SAMUEL H. BLECH, Primary Examiner.

PAUL LIEBERMAN, Assistant Examiner.

U.S. Cl. X.R.

260—45.85, 45.9, 75, 77.5